United States Patent [19]

Bullard

[11] Patent Number: 5,746,251
[45] Date of Patent: May 5, 1998

[54] MULTI-PORT FLUID VALVE

[76] Inventor: Horace Bullard, 3333 Henry Hudson Pkwy., Riverdale, N.Y. 10463

[21] Appl. No.: 652,375

[22] Filed: May 23, 1996

[51] Int. Cl.⁶ .................................................. F16K 5/04
[52] U.S. Cl. .................................. 137/625.12; 251/6
[58] Field of Search .................. 137/625.12, 625.11, 137/862; 251/6

[56] References Cited

U.S. PATENT DOCUMENTS

| | | | |
|---|---|---|---|
| 2,389,000 | 11/1945 | Roberts | 137/625.12 |
| 3,773,078 | 11/1973 | Suntheimer | 137/625.11 |
| 3,995,494 | 12/1976 | Muller et al. | 137/625.11 |
| 4,878,622 | 11/1989 | Jamison et al. | 251/6 |
| 5,326,033 | 7/1994 | Anfindsen | 261/6 |

*Primary Examiner*—Marguerite McMahon
*Attorney, Agent, or Firm*—Eliot S. Gerber

[57] ABSTRACT

A multi-port valve mechanism for fluids, especially compressed air, comprises a cylindrical (ring-like) housing. A motor drives a shaft centered in the housing which is rotatably supported by the housing walls. The shaft carries an arm having one, or two, rollers which pinch close a flexible and resilient elongated tube, which tube is secured to the inside wall of the housing. A series of port orifices are aligned and spaced along the tube; so that an inlet port is connected to outlet ports, one after the other, in sequence, as the pinch roller is moved along the tube by the arm.

16 Claims, 2 Drawing Sheets

MULTI-PORT FLUID VALVE

FIELD OF THE INVENTION

The present invention relates to fluid valves and more particularly to mechanically operated air valves with multi-outlet ports.

BACKGROUND OF THE INVENTION

There is a need in certain industrial and medical fields for a valve system for fluids, specially air, in which a fluid under pressure is supplied to a plurality of ports in a selected sequence. Although the embodiment described below is a valve system for compressed air in the range of 1–20 pounds per square inch (psi) it is applicable to air at other pressures, to other gases and to liquids, i.e., to all fluids. For example, a sequence of valves is operated in a multi-port valve system as follows: a valve is opened and air pressure is supplied to outlet port 1, after 10 seconds, a second valve is opened and air pressure is supplied to outlet port 2, and so on until air is supplied, in timed sequence, to all of the outlet ports. In this example, the air pressure is relatively constant, the valves are operated so that the air is supplied to the outlet ports in a fixed and timed sequence and each valve is opened at a selected time.

It is possible to construct a suitable multi-port valve system which opens each port in sequence using electrically controlled fluid valves, for example, a system using a solenoid fluid valve at each outlet port. However, such electrically controlled valves may be expensive, complex and may fail, especially in a dusty or humid environment. They should not be used if the fluid is a gas which may leak and explode. If there are many outlet ports, for example, 50–100, the cost and complexity of control of solenoid valves presents a detriment to the practical use of devices employing such valve systems.

One use of multi-ports which are supplied with air, in sequence, is in connection with the inflation of sets of balloon cuffs (inflatable circumferential tubes). Generally the cuffs surround a limb of a person and are inflated, in timed sequence, starting from the cuff furthest from the trunk. The inflation sequence, in effect, acts as a parastaltic pump and moves blood toward the trunk. That type of device has been used following surgical procedures to move the blood in the legs of hospitalized patients, as an aid for patients with angina, and as a blood exercise system.

In Apstein U.S. Pat. No. 3,811,431 entitled "Programmed Venous Assist Pump", at FIGS. 2–4D, a multi-port valve is connected to a set of inflatable cuffs. The valve has a motor-driven cylindrical rotor having flats (channels) which connect different ports in the housing as the rotor is turned.

In Rosett U.S. Pat. No. 1,608,239 entitled "Therapeutic Device", at FIGS. 2–4, a multi-port distributing valve mechanism is connected to inflatable circumferential tubes (cuffs). The valve mechanism has a motor driven rotor with grooves which connects an inlet port, having compressed air, in sequence, to outlet ports connected to the cuffs. Each cuff is inflated and deflated in sequence.

In Bullard U.S. Pat. No. 4,865,020 entitled "Apparatus And Method For Movement Of Blood By External Pressure", each cuff is connected to an individual valve, shown in FIGS. 7A–7B. In each valve a piston is slid within a housing to open and close ports.

Bullard Patent Application PCT/US91/03021 (WO 92/19206) entitled "Apparatus And Method For Movement Of Blood", FIG. 10, shows a multi-port valve in which a motor-driven flat rotor rotates in a cylindrical housing to connect outlet ports, in sequence, to a supply of compressed air.

Weinberg U.S. Pat. No. 2,781,041 shows a valve device for sequential inflation of bladders (cuffs), with the inflated bladders being held inflated.

The patents cited above are incorporated by reference herein.

SUMMARY OF THE INVENTION

A multi-port valve mechanism includes a motor having an output shaft, such as a step motor, and an arm carried by the motor output shaft. The arm has a free end with a pair of rollers. The rollers act to pinch an elongated, flexible and resilient tube against the inside wall of a cylindrical housing. The pinching of the tube by the rollers acts as a closing valve which is moved along the length of the tube.

An entry port, connected to a source of compressed air, leads to one end of the tube and a series of outlet ports, each connected to an inflatable cuff, are connected to the tube along its length. As the rollers move along the tube, first the inlet port is opened to the tube and then, in sequence, each of the outlet ports is opened (connected) to the inlet port through the tube.

Preferably at the moment the roller has passed the inlet port, the outlet ports are first connected to atmosphere (to release the pressurized air) and then closed to atmosphere and connected to the series of cuffs (balloons) (to inflate the cuffs in sequence).

BRIEF DESCRIPTION OF THE DRAWINGS

The following detailed description, of the inventor's presently known best mode of practicing the invention, should be taken in conjunction with the accompanying drawings.

In the drawings.

DETAILED DESCRIPTION OF THE INVENTION

Figure 1:
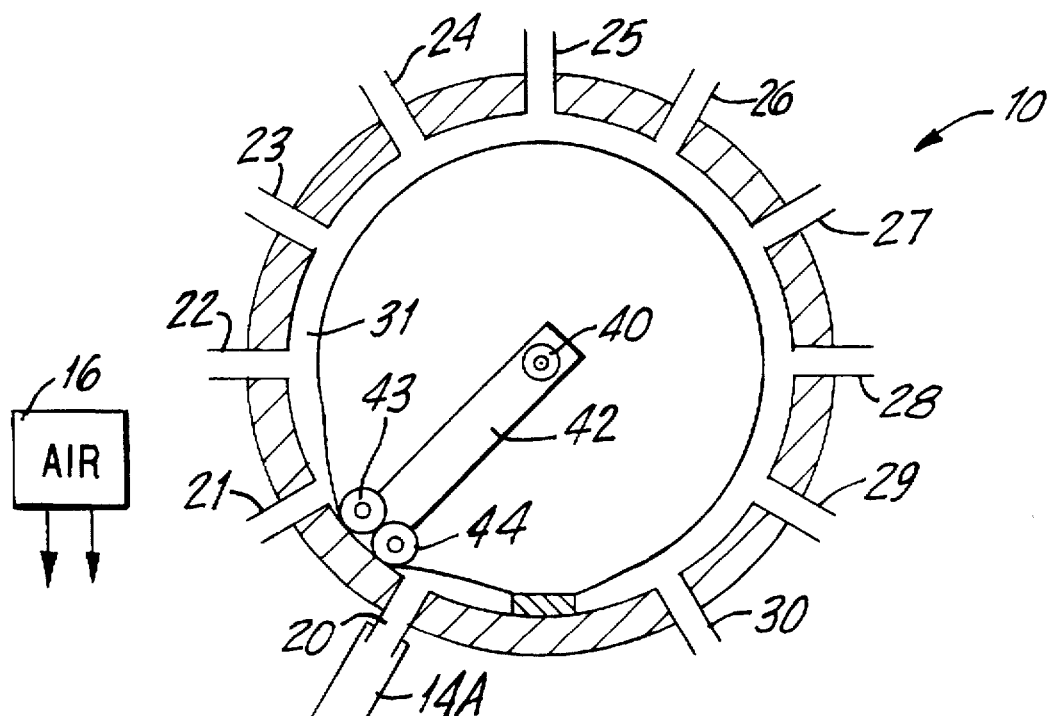
FIG. 1 is a side cross-sectional view of a single multiport valve mechanism in accordance with the present invention.
Figure 3:
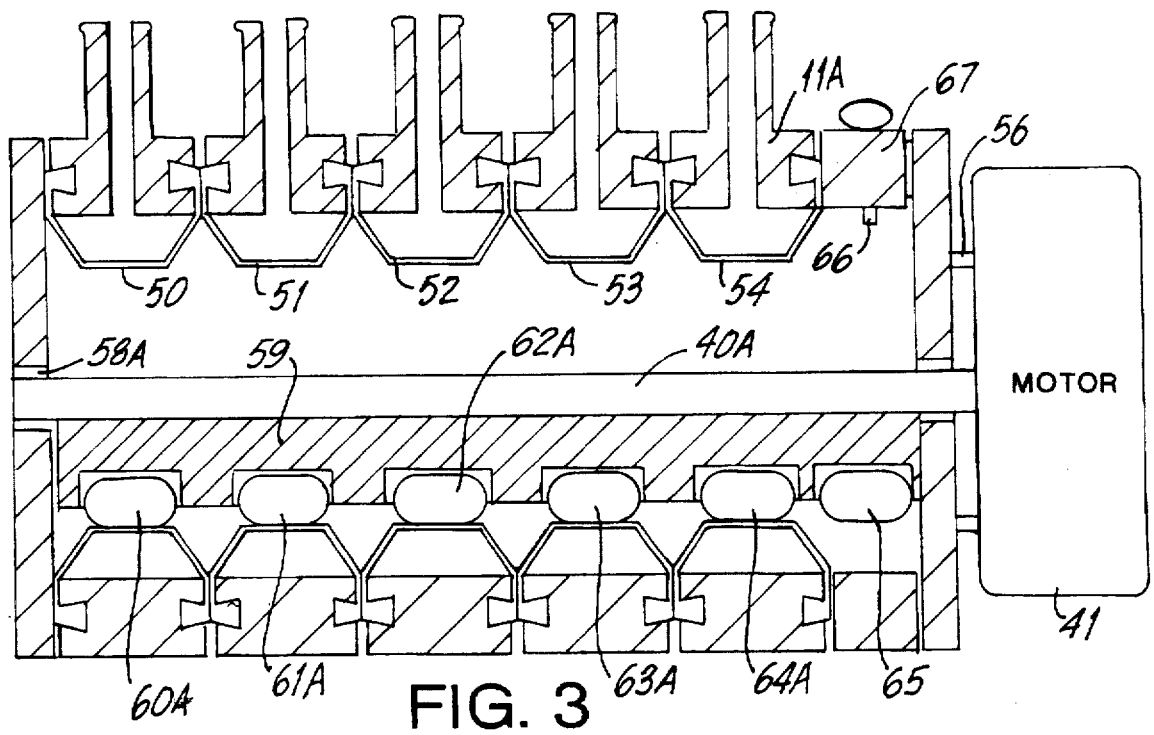
FIG. 3 is a perspective view of a ganged multi-port valve mechanism.
Figure 4:
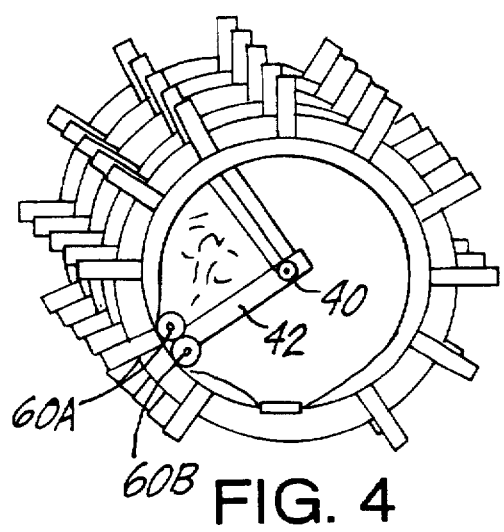
FIG. 4 is a side cross-sectional view of the mechanism of FIG. 3.

FIG. 1 shows a single multi-port valve mechanism and FIGS. 3 and 4 show a gang of such valve mechanisms side-by-side in a unitary housing.

As shown in FIG. 1, the single multi-port valve 10 has a cylindrical casing 11, which is ring-like (circular) in cross-section. The casing may have end walls (not shown) to enclose the valve mechanism. The casing 11 is of a suitable material, such as brass or aluminum, or formed of an engineering plastic.

Figure 2:
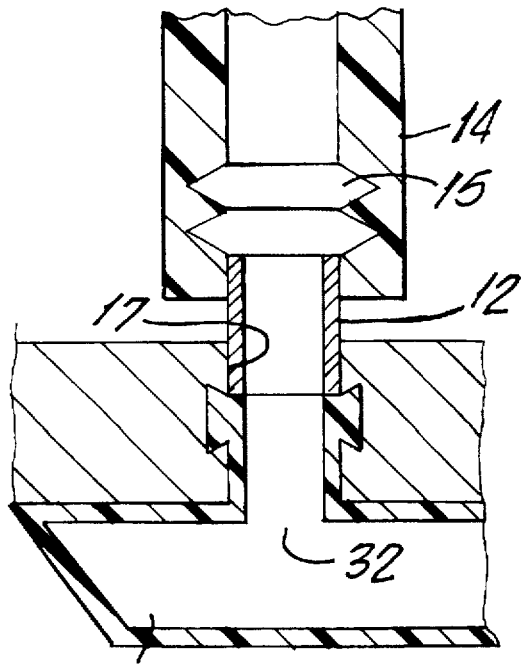
FIG. 2 is an enlarged cross-sectional side view of a port.

The casing 11 has a series of ports 20–30. The ports 20–30 may have formed integrally with the casing 11, as in FIGS. 3 and 4, which is preferred when the casing 11 is injection-molded. Alternatively, as shown in FIG. 2, the ports may be separate members. As shown in FIG. 2, each port comprises a bushing 12 having an exterior outer hose connector 15 with V-shaped grooves adapted to receive a flexible hose 14 thereon. Each bushing 12 also has an exterior screw thread which is screwed into a screw thread in a through-hole 17 of the casing 11. A flexible hose 14 is connected on the hose connector 15.

A source of air pressure 16, preferably an air pump and tank, is connected to a hose 14A leading to the inlet port 20. Preferably the air is at 1-20 pounds per square inch above atmospheric pressure (1-20 psi or 70.3-1406 gms/sq cm) and most preferably 5-10 psi (351.5-703 gns/sq cm).

The air enters through the orifice of the inlet port into an elongated, flexible and resilient tube 31. The tube is of a suitable rubber or an elastomer plastic. The tube 31 is hollow and has a series of orifices 32 and an air-tight coupling at each of its orifices which couples the orifice to a port 20-30, see FIG. 2.

The outlet ports 21-30 are of the same construction as the port structure shown in FIG. 2, or alternatively the port structure shown in FIGS. 3 and 4.

Each outlet port 21-30 is connected to an outlet hose. For example, the hoses may be connected to a supply of pressurized air to inflate a series of cuffs (balloons) positioned about a subject's limbs. Each cuff also has an outlet hose which is connected to a single solenoid-operated valve. When that valve is opened the air pressure is simultaneously released from all the cuffs. Alternatively, the cuffs' outlet hoses may be connected to a multi-port valve mechanism of the type shown in FIGS. 1, 3 and 4, in which the "inlet port" is open to atmosphere and the outlet ports are connected, in sequence, to atmosphere through the tube and inlet port. Such a multi-port valve permits the cuffs to be deflated in a selected and timed sequence.

A rotatable shaft 40 is positioned at the center of the casing 11. The shaft is rotated in one direction (clockwise in FIG. 1) by a motor. For example, the motor may be an AC or DC motor which slowly rotates the shaft 40 through a gear box (transmission), a computer controlled step motor, an air motor or a hydraulic motor. An arm 42 is fixed to the shaft and rotates with it. The arm 42, at its outer end (free end) carries a tube pinch means, preferably a pair of rollers. Specifically arm 42 carries two rollers 43, 44 which pinch tube 31 against the casing 11 in an air-tight fashion. The pinch action of the rollers 43, 44 acts as a pinch valve closure which is rotated along the inner surface of the casing 11. The outlet ports 21-30 are connected, in a selected timed sequence, to the inlet port 20. Generally, but not necessarily, the shaft would be rotated uniformly so that the sequence is evenly timed. For example, outlet port 21 is connected to inlet port 20 and each port 22-30 is also connected, in sequence, each after 10 seconds, to the inlet port 20.

In the embodiment of FIGS. 3 and 4, a series of five tubes 50-54 are positioned on the inside wall of a cylindrical casing 11A (housing) having end walls. A motor 41 is connected to the housing 55 by bolts 56. For example, motor 41 may be a step motor which is controlled from a simple and low-cost computer or timer. The motor 41 has an output shaft which is fixed to shaft 40A which is rotatable within bearings 58A, 58B at the opposite end walls of the housing 55.

The shaft carries a flat paddle arm 59 and a series of pinch rollers 60A, 60B-64A, 64B which are rotatably mounted on the outer end of the paddle arm 59. The pinch rollers 60A, 60B pinch and close tube 50 against the inner cylindrical wall of the housing 55. Similarly, each of the tubes 51-54 is pinched and closed by its respective pinch rollers, 62A, 62B-64A, 65B respectively. The roller 65 operates button 66 of switch 67 which is used for timing.

In the embodiment of FIGS. 3 and 4, as in the embodiment of FIG. 1, each of the tubes 50-54 is connected, in an airtight seal, with an inlet port leading, via a hose, to a source of compressed air, and a series of outlet ports, each leading, via a hose, to an inflatable cuff.

Modifications may be made to the above-described embodiments of the present invention within the scope of the sub-joined claims. For example: (1) the housing may be flat and the arm and its pinch roller may be carried by a rack which is moved along the top of the tube by a motor-driven pinion gear; (2) the tube may be positioned on the outer wall of a cylindrical housing and the roller moved along the outer face of the tube by a U-shaped arm carried by a motor-driven shaft which is centered in the housing; (3) the shaft may be rotated at different and selected speeds between each port so that the ports are opened with different time periods between each port opening, although the ports are evenly spaced; (4) the ports are unequally spaced along the tube so that the ports are opened with different time periods between such port openings, although the shaft is rotated at a constant speed; (5) the casing is provided with two tubes arranged end to end with, for example, 5 ports connected to the first tube and 5 ports connected to the second tube. In this example the first 5 ports may be used to inflate 4 cuffs and the second 5 ports may be used to deflate the same 4 cuffs or the first 5 ports may be used to inflate a first set of 4 cuffs and the second 5 ports may be used to inflate a second set of 5 cuffs; (6) the inlet ports of a gang of values are supplied with air pressure at different pressures; for example, in the embodiment of FIGS. 3 and 4 the five inlet ports are supplied with air at 2, 4, 6, 8 and 10 lbs/sq.in., respectively, and each of the air lines to those inlet ports has a solenoid-operated valve.

What is claimed is:

1. A multi-port fluid valve mechanism comprising:
   (a) a housing having an exterior and a cylindrical inner face;
   (b) a rotatable shaft centered in the housing and rotatably supported therein;
   (c) an arm having an inner end connected to the shaft and having an outer end;
   (d) a pinch valve means carried by the arm proximate the arm's outer end to pinch close an elongated flexible and resilient hollow tube having an axis, the tube being positioned along the housing's inner face, the tube having a plurality of orifices spaced-apart and parallel to the axis; and
   (e) a series of ports each of which leads from the exterior of the housing to an orifice of the tube.

2. A multi-port fluid valve as in claim 1 wherein one port is an air inlet port adapted to be connected via a hose to a source of compressed air.

3. A multi-port fluid valve as in claim 1 wherein at least three ports are air exit ports adapted to be connected via hoses to inflatable cuffs.

4. A multi-port fluid valve as in claim 1 and further including a motor means connected to the shaft to rotate the shaft.

5. A multi-port fluid valve as in claim 4 wherein the motor means comprises a step motor.

6. A multi-port fluid valve as in claim 1 wherein the pinch valve comprises a roller.

7. A multi-port fluid valve as in claim 1 wherein the pinch valve means comprises a pair of rollers.

8. A multi-port fluid valve as in claim 1 wherein the ports include a single inlet port and at least 5 exit ports which are exit ports connected to orifices evenly spaced along the tube.

9. A multi-port fluid valve as in claim 1 wherein the valve mechanism includes a series of valve mechanisms as specified in claim 1 in a single housing and having a single rotatable shaft.

10. A multi-port fluid valve mechanism comprising:

(a) a housing having an exterior and an inner face;

(b) a shaft positioned proximate the housing;

(c) motor means to move the shaft;

(d) an elongated flexible and resilient tube positioned along the inner face;

(e) pinch means connected to the shaft and carried therewith to close the tube by pinching the tube;

(f) a series of port means spaced along the tube, each port means being adapted to connect the interior of the tube to a fluid conduit.

11. A multi-port fluid valve as in claim 10 wherein one port means is an air inlet port adapted to be connected via a hose to a source of compressed air.

12. A multi-port fluid valve as in claim 10 wherein at least 3 port means are air exit ports adapted to be connected via hoses to inflatable cuffs.

13. A multi-port fluid valve as in claim 10 wherein the motor means comprises a step motor.

14. A multi-port fluid valve as in claim 10 wherein the pinch means comprises a roller.

15. A multi-port fluid valve as in claim 10 wherein the pinch means comprises a pair of rollers.

16. A multi-port fluid valve as in claim 10 wherein the port means include a single inlet port means and at least 5 exit port means which are connected to orifices evenly spaced along the tube.

\* \* \* \* \*